US009235521B2

(12) United States Patent
Lippert et al.

(10) Patent No.: US 9,235,521 B2
(45) Date of Patent: Jan. 12, 2016

(54) CACHE SYSTEM FOR MANAGING VARIOUS CACHE LINE CONDITIONS

(71) Applicant: LSI Corporation, San Jose, CA (US)

(72) Inventors: Gary M. Lippert, Kasson, MN (US); Judy M. Gehman, Fort Collins, CO (US); Scott E. Greenfield, Burnsville, MN (US); Jerome M. Meyer, Chanhassen, MN (US); John M. Nystuen, Burnsville, MN (US)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 293 days.

(21) Appl. No.: 13/952,710

(22) Filed: Jul. 29, 2013

(65) Prior Publication Data

US 2015/0026411 A1   Jan. 22, 2015

Related U.S. Application Data

(60) Provisional application No. 61/856,789, filed on Jul. 22, 2013.

(51) Int. Cl.
*G06F 12/08* (2006.01)

(52) U.S. Cl.
CPC ........ *G06F 12/0833* (2013.01); *G06F 12/0888* (2013.01)

(58) Field of Classification Search
CPC ...................... G06F 12/0833; G06F 21/08888
See application file for complete search history.

(56) References Cited

U.S. PATENT DOCUMENTS 6,460,122 B1 * 10/2002 Otterness et al. ............. 711/154
2015/0089155 A1 * 3/2015 Busaba et al. ................ 711/141

* cited by examiner

*Primary Examiner* — Hiep Nguyen
(74) *Attorney, Agent, or Firm* — Duft Bornsen & Fettig

(57) ABSTRACT

A cache controller configured to detect a wait type (i.e., a wait event) associated with an imprecise collision and/or contention event is disclosed. The cache controller is configured to operatively connect to a cache memory device, which is configured to store a plurality of cache lines. The cache controller is configured to detect a wait type due to an imprecise collision and/or collision event associated with a cache line. The cache controller is configured to cause transmission of a broadcast to one or more transaction sources (e.g., broadcast to the transaction sources internal to the cache controller) requesting the cache line indicating the transaction source can employ the cache line.

20 Claims, 6 Drawing Sheets

CACHE SYSTEM FOR MANAGING VARIOUS CACHE LINE CONDITIONS

CROSS-REFERENCE TO RELATED APPLICATIONS

The present application claims the benefit under 35 U.S.C. §119(e) of U.S. Provisional Application Ser. No. 61/856,789, entitled CACHE SYSTEM FOR MANAGING VARIOUS CACHE LINE CONDITIONS, filed on Jul. 22, 2013. U.S. Provisional Application Ser. No. 61/856,789 is herein incorporated by reference in its entirety.

FIELD OF THE INVENTION

The present invention is directed to a cache system, and more particularly to a cache system configured to manage various cache line conditions.

BACKGROUND

Data processing systems typically utilize high speed buffer memory, referred to as cache memory ("cache"), to improve memory access time for the systems' processing devices. Cache is considered smaller, faster memory that stores copies of data from the most frequently used main memory, or system memory, locations. In turn, if most memory accesses are at the cached memory locations, the average latency of the memory accesses is closer to the cache latency than to the latency of the main memory.

SUMMARY

A cache controller configured to detect a wait type (i.e., a wait event) associated with an imprecise collision and/or contention event is disclosed. The cache controller is configured to operatively connect to a cache memory device, which is configured to store a plurality of cache lines. The cache controller is configured to detect a wait type due to an imprecise collision and/or collision event associated with a cache line. The cache controller is configured to cause transmission of a broadcast to one or more transaction sources requesting the cache line indicating the transaction source can employ the cache line.

This Summary is provided to introduce a selection of concepts in a simplified form that are further described below in the Written Description. This Summary is not intended to identify key features or essential features of the claimed subject matter, nor is it intended to be used as an aid in determining the scope of the claimed subject matter.

BRIEF DESCRIPTION OF THE FIGURES

The Written Description is described with reference to the accompanying figures. The use of the same reference numbers in different instances in the description and the figures may indicate similar or identical items.

WRITTEN DESCRIPTION

Figure 1:
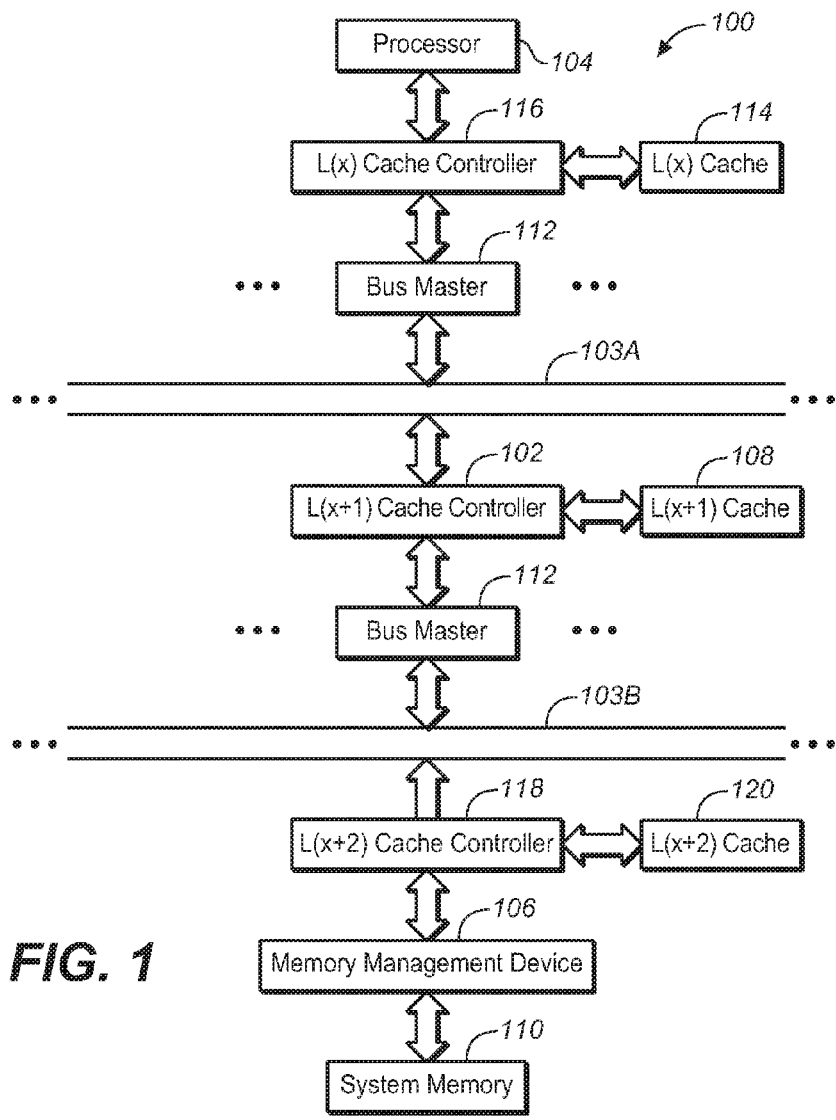
FIG. 1 is a block diagram of a cache system in accordance with an example embodiment of the present disclosure.

FIG. 1 shows a block diagram of a system 100 in accordance with the present disclosure. As shown in FIG. 1, the system 100 includes a cache controller 102 that is communicatively coupled between a processor 104, such as a microprocessor, and a memory management device 106 via one or more communication buses (e.g., a first bus 103A and a second bus 103B are shown in FIG. 1). Additionally, the cache controller 102 is communicatively coupled to cache memory 108 (e.g., an L(x+1) cache device), and the memory management device 106 is operatively coupled to system (e.g., main) memory 110. In an embodiment of the present disclosure, the cache controller 102 comprises an L(x+1) controller 102 configured to manage the storage of cache data within the L(x+1) cache 108. The cache controller 102 is communicatively coupled to a bus master 112 and an L(x) cache 114. In an example embodiment of the present disclosure, the cache controller 102 comprises an L2 cache controller that manages storage of cache data for an L2 cache. It is understood that the L(x) cache 114 has an associated cache controller 116 that is configured to manage storage of cache data for the L(x) cache 114. The processor 104 is configured to issue transactions for accessing data that may reside in various memory components (i.e., the system memory 110, the L(x) cache 114, the L(x+1) cache memory 108, etc.) of the system 100. The bus master 112 is configured to initiate a read or a write transaction within the next level cache or system memory (e.g., the main memory 110) should there be no next level cache. The system 100 also includes an L(x+2) cache controller 118 that is communicatively coupled to an L(x+2) cache memory 120. For example, the data transfers between the system memory and the cache memory of a bus master are controlled by a respective cache controller, which manages the corresponding cache memory based upon the requirements of the bus master. It is also contemplated that the system 100 described herein may incorporate additional cache controllers and/or associated cache memory devices (i.e., other L(x) controllers and/or cache memory devices, other L(x+1) controllers and/or cache memory devices, L(x−1) controllers and/or cache memory devices, L(x+3) controllers and/or cache memory devices, etc.).

Figure 2:
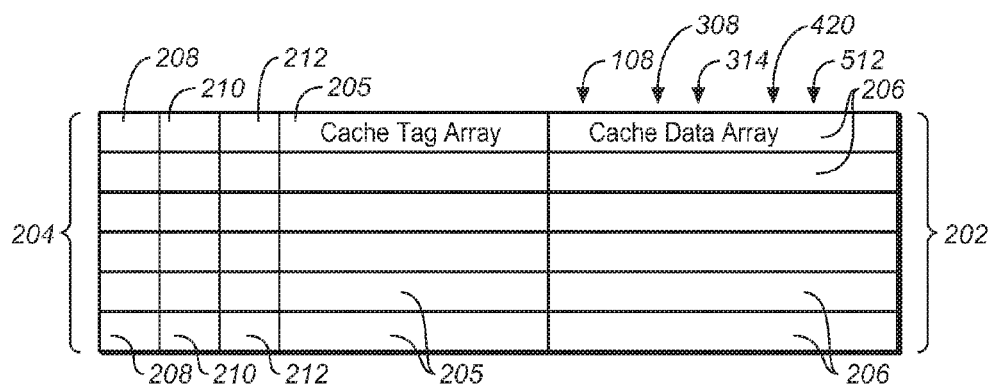
FIG. 2 illustrates a cache tag array and a cache data array in accordance with an example embodiment of the present disclosure

As shown in FIG. 2, the cache devices (e.g., cache memory) described herein comprise a data array 202 and tag array 204. In an embodiment of the present disclosure, the tag array 204 includes a field representing an address of the data contained in the cache memory device, and the data array 202 includes the data itself. For example, the data array 202 comprises one or more cache lines 206, or cache entries, that represent the data stored within a respective cache, and the tag array 204 includes a field 205 representing an address to a corresponding cache line 206. As described in greater detail herein, the tag array 204 also includes one or more data fields (i.e., flags 208, 210, 212 representing a cache state (e.g., valid, invalid, dirty, write permission, no write permission, read permission, no read permission, marked for eviction, busy, fill pending, etc.)). Thus, a cache controller is configured to perform one or more line fill operations during operation of the system 100. During a line fill operation, the tag field representing the address is stored within the tag array 204 and data representing the cache data is stored within a corresponding cache line 206. The cache tag array 204 is configured to maintain a cache state for a corresponding cache line stored by the cache memory device (e.g., a dirty state, etc.).

Figure 3:
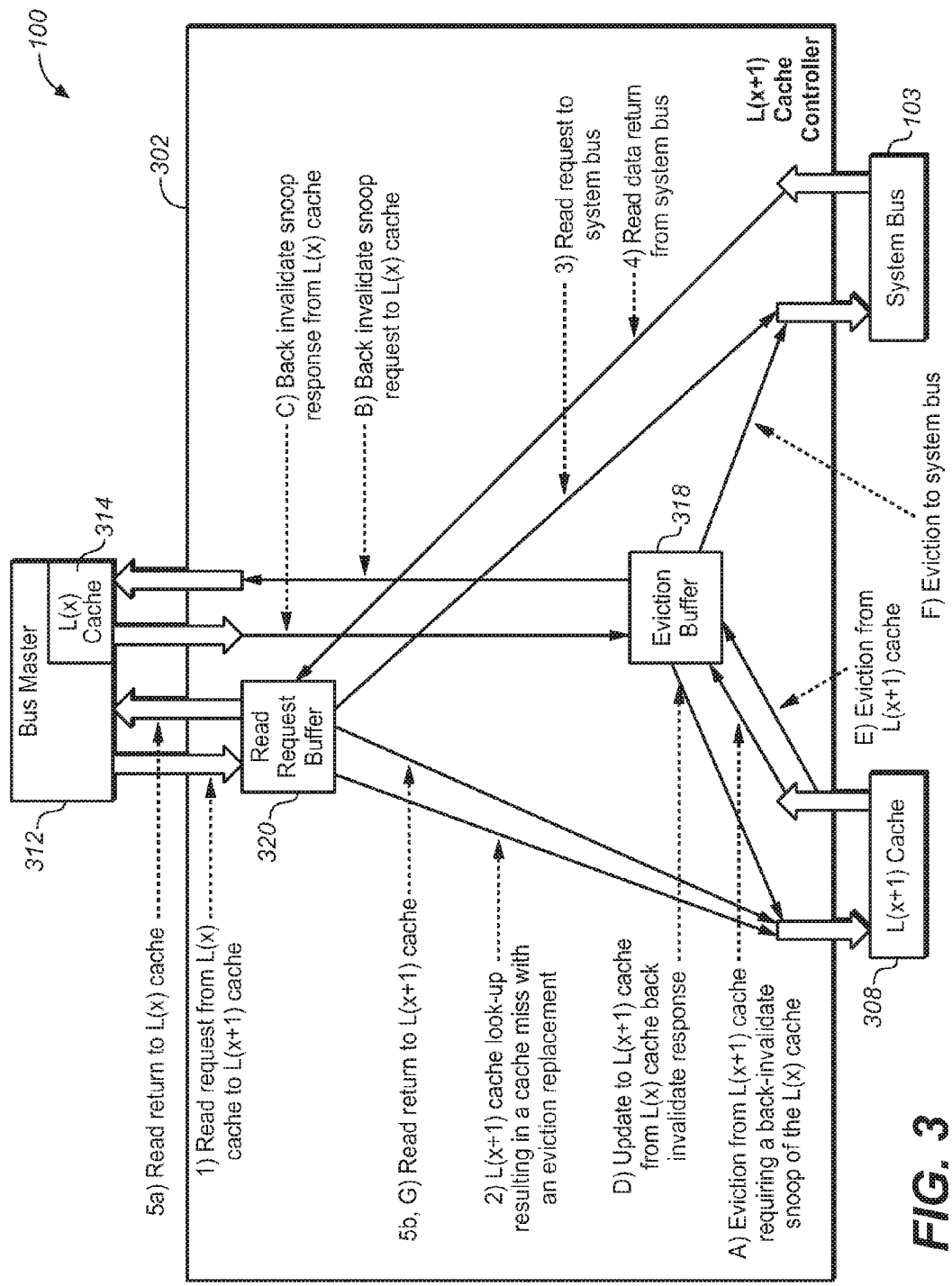
FIG. 3 is a block diagram of a cache controller configured for cache line eviction and allocation in a hierarchical inclusive cache system in accordance with an example embodiment of the present disclosure.

FIG. 3 illustrates a cache system 100 in accordance with a specific embodiment of the present disclosure. As shown, the system 100 includes a cache controller 302 (i.e., cache controller 102 shown in FIG. 1) that includes an eviction buffer engine 318 configured to manage a cache line 206 (i.e., a block of fixed size data) eviction operations from the cache memory 308 (i.e., lower level cache memory) to a higher level memory (i.e., L(x+2) cache, the system memory 110) in a cache memory hierarchy of the system 100. In an embodiment of the present disclosure shown in FIG. 3, the system 100 comprises an inclusive cache memory system. For example, the other cache memory (e.g., L(x) cache memory, L(x+2) cache memory) and the cache memory 308 (e.g., L(x+1) cache memory) are inclusive. For example, each of the higher level cache memory and the lower level cache memory can retain the same cache lines. In another example of inclusivity, the lower level cache memory contains a subset of the cache lines 206 contained in the higher level cache. In other examples, the higher level cache may manage multiple lower level caches. In another embodiment of the present disclosure, the system 100 comprises a non-inclusive cache memory system.

As shown in FIG. 2, the tag array 204 may include an eviction state flag 208 for indicating whether a corresponding data line is set for eviction. In other words, the tag array 204 is configured to maintain an eviction state for the corresponding cache line 206 utilizing an eviction state flag 208. When the eviction state flag 208 has been set such that the corresponding cache line is to be evicted (e.g., the eviction state flag 208 is set to "Evicting"), the cache controller 302 is configured to prevent additional access to the corresponding cache line 206 (i.e., prevent additional accesses due to other unrelated requests). Additionally, the cache controller 302 prevents the cache line 206 from being selected again as an eviction target (e.g., in the event another tag lookup to the same congruence class requires an allocation). Thus, the cache controller 302 is configured to prevent two separate cache line fill operations from trying to simultaneously, or at least substantially simultaneously, fill the same location in the cache memory device (e.g., the cache memory 108, 308).

In one or more embodiments of the present disclosure, the cache controller 302 is configured to determine if an eviction operation is to occur. For example, the cache controller 302 has received a request to add a new cache line 206 to the cache memory 308 (e.g., perform a line fill operation). An eviction occurs when there is no additional space in the respective congruence class to add the new cache line 206, which results in the replacement of the older data with newer data. In one or more embodiments of the present disclosure, the eviction buffer 318 is configured to perform (e.g., cause the controller 302 to perform) a snoop operation to determine whether more recent data is available when a corresponding cache line 206 is set for eviction. For example, the cache controller 302 is configured to perform a snoop operation of the L(x) cache 314 to determine whether there is more recent data within the L(x) cache 314 corresponding to the data set for eviction (e.g., if the cache line 206 of the L(x) cache 314 has updated data as compared to the corresponding cache line 206 of the L(x+1) cache 308). In other words, the controller 302 is configured to determine, via a suitable snoop filtering technique, whether a cache line 206 in the L(x) cache 314 that corresponds to the cache line 206 set for eviction in the L(x+1) cache 308 may include modified data with respect to the data stored in the cache line 206 set for eviction. If there is more recent data within the L(x) cache 314, the cache controller of the L(x) cache 314 is configured to provide the more recent data to the L(x+1) controller 302, which is configured to write more recent data to the L(x+1) cache 308 such that the cache 308 has the most recent data prior to eviction. If there is no more recent data, the L(x+1) cache controller 302 notifies the eviction buffer 318 (e.g., an eviction buffer engine) that no more recent data for the corresponding cache line 206 is available (e.g., the L(x+1) cache memory contains the most recent data).

The cache controller 302 is configured to evict the cache line 206 set, or identified, for eviction. For example, the controller 302 causes the cache line 206 set for eviction to be loaded into the eviction buffer 318. The cache line 206 (e.g., the most recent data from the L(x+1) cache memory 308) is then written (e.g., loaded) to the L(x+2) cache (e.g., cache memory device 120) or system memory (e.g., system memory 110). Once the data has been evicted from the L(x+1) cache memory 308, the controller 302 causes an update to the tag array 204 (e.g., eviction flag 208) to clear (i.e., un-set) the eviction state of the cache line 206. The controller 302 causes an update to the fill pending state within the fill pending flag 210 (e.g., modify the fill pending state to indicate the corresponding cache line 206 is "Fill Pending"). In other words, the cache tag array 204 is modified to indicate that the cache line 206 is ready to receive data associated with the line fill operation. The tag array 204 is also updated with the appropriate address tag for the outstanding line fill. The "Fill Pending" entry indicates that a line fill operation is pending.

The cache controller 302 is configured to check the state of the tag array 204 before a line fill operation is completed (e.g., the line fill operation for the data furnished from the system memory to the L(x+1) cache controller 102 but not stored in the L(x+1) data array 202). If the "Evicting" entry is still present, the line fill data is stored within a read request buffer 320 temporarily until the "Evicting" entry is changed.

The controller 302 is configured to update the tag array 204 such that the "Fill Pending" status is removed to indicate that the data is available in the data array 202. In one or more embodiments of the present disclosure, the controller 302 is configured to forward the cache line 206 to the bus master 312 to remove any additional latency that may occur while waiting for the eviction to complete.

Figure 4:
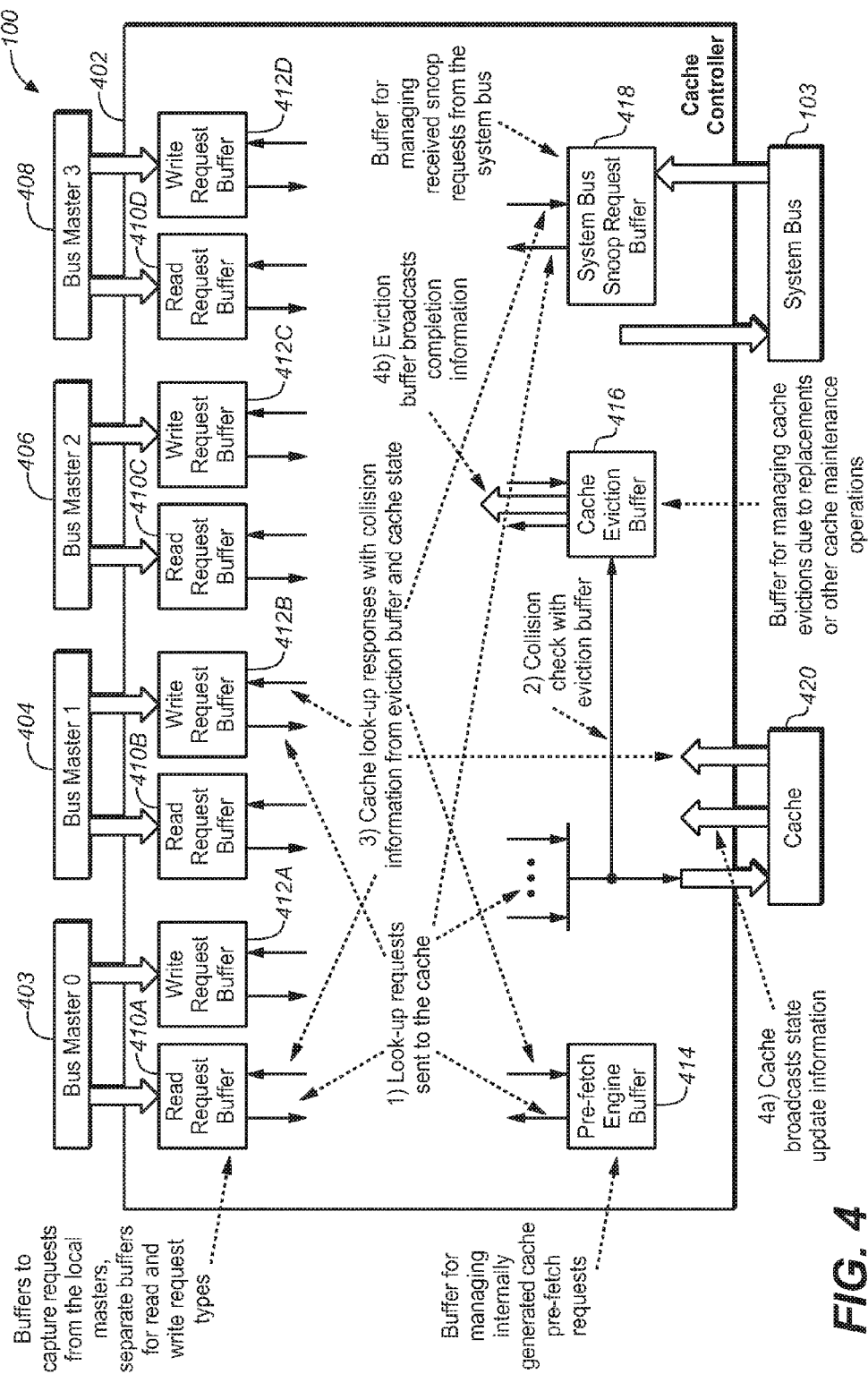
FIG. 4 is a block diagram of a cache controller configured to detect a wait type associated with an imprecise collision and/or contention event in accordance with an example embodiment of the present disclosure.

As shown in FIG. 4, the system 100 includes a cache controller 402 communicatively coupled to multiple bus masters 403, 404, 406, 408. The cache controller 402 includes read request buffers 410A, 410B, 410C, 410D and write request buffers 412A, 412B, 412C, 412D that correspond to each bus master 403, 404, 406, 408, respectively. The buffers are configured to hold read and write requests, respectively, pertaining to each corresponding bus master 403, 404, 406, 408. The cache controller 402 also includes a pre-fetch engine buffer 414 configured to manage internally generated cache pre-fetch requests, a cache eviction buffer 416 for managing cache evictions due to replacements and/or other cache maintenance operations, and a system bus snoop request buffer 418 for managing received snoop request from the system bus.

The cache controller 402 is configured to identify a wait type as a strict ordering required, a required resource is unavailable, the required cache line is in transition, or the required cache line is in use by another resource. A wait type is identified when the cache 420 is shared between multiple lower level caches and involves contention and/or collision situations to be resolved. In other words, a collision and/or contention event occurs when two or more accesses are directed to a single cache line (e.g., two or more resources are attempting to access the same cache line 206). A strict ordering type is required during read after read hazards, read after write hazards, write after read hazards, write after write hazards, and other bus protocol requirements. In other words, a strict ordering type describes situations where a specific event occurring resolves the contention/collision. When the controller 402 determines that the wait type is due to imprecise collision (i.e., time to resolve the contention/collision event is not known and/or the specific event to resolve the contention/collision is not known), the controller 402 is configured to implement a broadcast protocol (i.e., transmit a broadcast indicating that a transaction source can employ (e.g., write to, perform a background read, etc.) the cache line 206) based upon the imprecise collision type as described in greater detail below.

In an embodiment of the present disclosure, the controller 402 is configured to identify, or detect, a wait type associated with an imprecise collision and/or contention event indicating that a required resource is not available. This imprecise collision and/or contention event occurs when resources (e.g., buffers, cache, etc.) cannot be allocated for a line fill operation (e.g., no available locations in a congruence class or an eviction is required and there is not enough available space within an eviction buffer 416 for the data to be evicted). In this situation, the controller 402 is configured to cause transmission of a broadcast representing a cache state to one or more transaction sources (e.g., read request buffers 410A, 410B, 410C, 410D, write request buffers 412A, 412B, 412C, 412D, etc.) indicating that one or more resources are available. In an embodiment of the present disclosure when no available locations in a congruence class are available, the broadcast includes a tag address that is being written when an entry is updated.

In another embodiment of the present disclosure, the controller 402 is configured to identify, or detect a wait type associated with an imprecise collision and/or contention event based upon a cache line in transition. This type of imprecise collision and/or contention event occurs when there is an address collision with an entry in the cache eviction buffer 416. For instance, the tag lookup result may be indeterminate and the data consistency cannot be guaranteed. This imprecise collision event also occurs when a line fill return cannot be completed (i.e., a pending eviction from the same cache line 206 location has not completed). This imprecise collision event may also occur when a cache line cannot be accessed due to an intermediate (e.g., non-stable) cache state (e.g., another transaction is utilizing the cache line and is guaranteed to complete eventually). When the controller 402 identifies, or detects, that a cache line is in transition, the controller 402 is configured to cause transmission of a broadcast that includes an updated tag state of the tag write.

In yet another embodiment of the present disclosure, the controller 402 is configured to identify, or detect, a wait type associated with an imprecise collision event indicating that a cache line is in use. This type of imprecise collision event occurs when a cache lookup request has generated a secondary transaction (i.e., a snoop request as described herein, or the like) that may cause the cache state or the cache data to be changed, and the secondary transaction must complete before any additional accesses to the corresponding cache line 206 can proceed. This situation may occur when the state of a snoop filter indicates that a snoop request is to be generated to one or more lower level caches (e.g., an L(x) cache device 314). For example, a bus master 0 (e.g., bus master 403) issues a read request. The snoop filter indicates that the bus master 404 with a lower level cache also includes a copy of the cache line 206. A snoop request is generated to bus master 1 (e.g., bus master 404) to pull the latest data. Once the snoop request (e.g., the secondary transaction) and the cache device is updated, the original request is allowed to restart. Depending on the type of request issued by the originating bus master and the state of the snoop filter, different types of secondary transactions are issued.

When the controller 402 identifies, or detects, that a cache line 206 is in use, the controller 402 is configured to cause the resource (i.e., a buffer within the cache implementing a secondary transaction corresponding to a cache line) implementing the secondary transaction to transmit a broadcast indicating that the secondary transaction is completed to one or more transaction sources. In an embodiment of the present disclosure, the controller 402 is configured to cause a cache tag pipe to notify the requesting buffer that a request be retried at a later time and the reason for the retry, which may reduce an occurrence of introducing additional stalls due to an increase in accessing the cache tag array 204. In other words, an affected buffer is configured to monitor broadcasts of tag writes or of secondary transaction completions that would allow the affected buffer to proceed.

In another embodiment of the present disclosure, the controller 402 is configured to insert a nominal random delay before the retried request is re-issued when multiple transactions are waiting. However, when a resource not related to the cache state is causing the contention event (e.g., no eviction buffers available), a full or a not full indication is issued by the controller 402.

In some embodiments of the present disclosure, a cache system 100 can utilize an error correction code (ECC) to protect data in the cache. However, if a cache system 100 receives a write request that is not a full ECC granule, the write request is identified as a partial write. In some instances, a write request that does not comprise a full cache line 206 is identified as a partial write. To complete a partial write, the cache system reads (e.g., a background read) the current data (i.e., the existing data) from the current data's location in cache, merges the new data with the current data, generates a new ECC corresponding to the merged data, and writes the merged data to the above-referenced location of the existing data.

Figure 5:
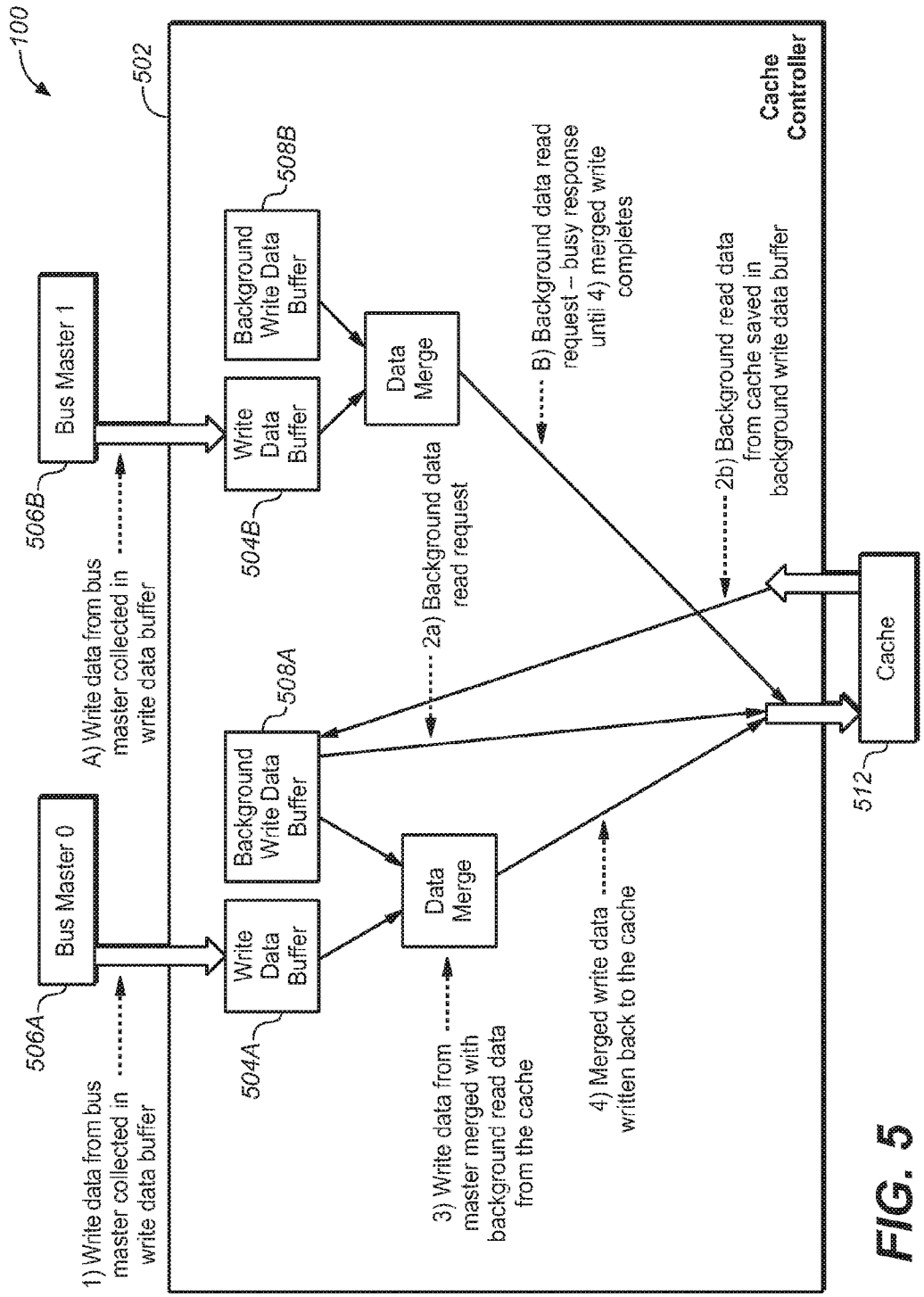
FIG. 5 is a block diagram of a cache controller configured to resolve partial write operations between various bus masters accessing a shared cache system in accordance with an example embodiment of the present disclosure.

As shown in FIG. 5, in another embodiment of the present disclosure, a cache controller 502 includes a write data buffer 504A, 504B for storing write data received from a corresponding bus master 506A, 506B. The controller 502 further includes a background write data buffer 508A, 508B for storing a copy of data in the cache data array 202. Thus, the background write data buffer 508A, 508B is configured to hold background merge data (e.g., a copy of the cache data to be merged with the write data) while a partial write is pending. The controller 502 is configured to perform a data merge operation to merge data from the corresponding write data buffer 504A, 504B and the corresponding background write data buffer 508A, 508B (e.g., perform a data merge function to merge the data as the data is at least simultaneously transferred from the respective write data buffer and the respective background write data buffer during a cache write operation).

The tag array 204 includes a busy flag 212 that is configured to also provide a busy state indication (e.g., whether the corresponding cache line 206 has been marked as "Busy"). In an embodiment of the present disclosure, the busy state is set to "Busy" when a background read occurs and completes successfully (i.e., a cache hit with write permission). When the busy state is set within the flag 212, the controller 502 prevents another background read to the same cache line 206 from successfully completing (e.g., a background read request from another bus master). Upon the controller 502 receiving partial write for a cache line 206, the controller 502 stores the data representing the partial cache line 206 to a write data buffer (buffer 504A or buffer 504B) and issues a background read operation for causing a copy of data stored within the cache line 206 (e.g., data within the cache 512) to be stored within the corresponding background write data buffer (buffer 508A or buffer 508B). Once the background read completes successfully, the controller 502 sets the busy state. The controller 502 then performs a data merge of the data stored within the respective buffers (e.g., data from the write data buffer 504A and the background write data buffer 508A or data from the write data buffer 504B and the background write data buffer 508B) into a cache line and generates a new ECC corresponding to the merged data. The merged data is then stored within the cache 512. The busy state is un-set (e.g., the flag 212 is cleared) when merged cache line is stored within the cache 512. In another embodiment of the present disclosure, when the busy state is set, the controller 502 may be configured to prevent other accesses to the corresponding cache line location, such as a shared read operation, that causes a cache state change (e.g., a cache state change that alters the write permission of the corresponding cache line, etc.). Once the merged cache line is stored within the cache 512, other bus masters may access the merged cache line (e.g., via a background read request, etc.).

Figure 6:
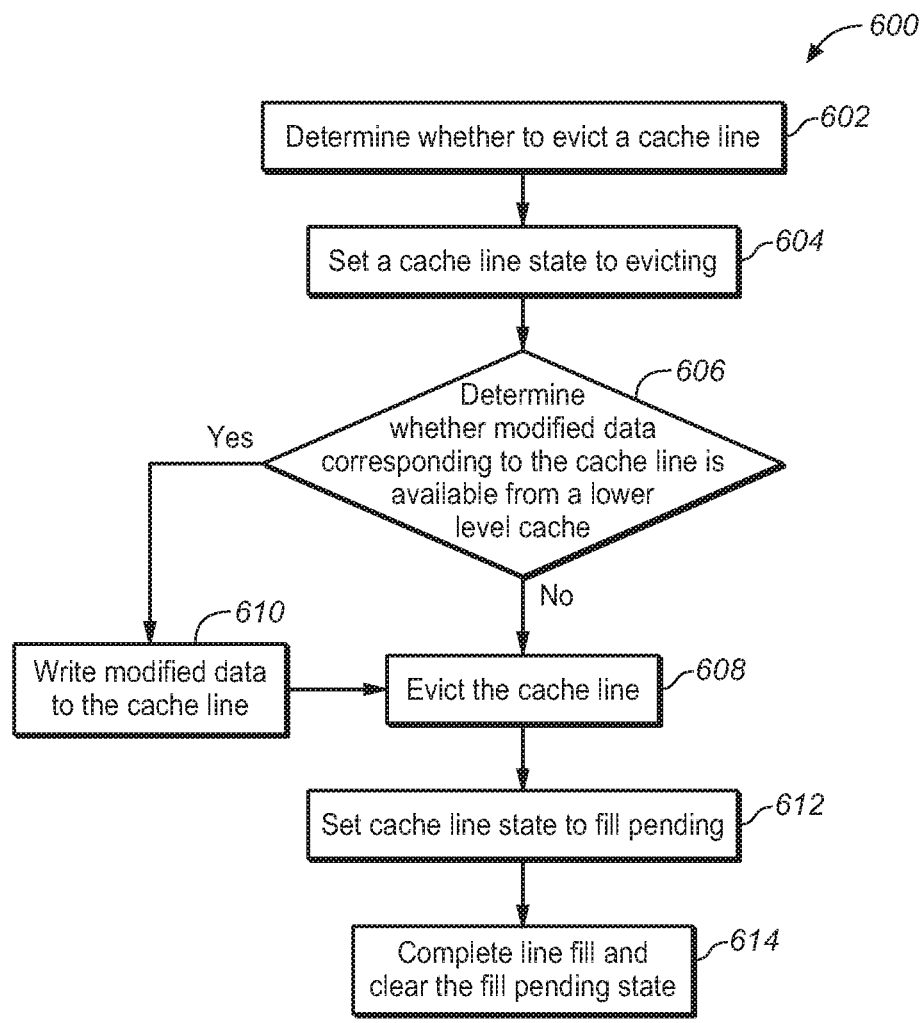
FIG. 6 is a method diagram for evicting cache lines and allocating (e.g., replacing) cache lines in accordance with an example embodiment of the present disclosure.

FIG. 6 illustrates a flow diagram for an example method 600 for cache line eviction and allocation (i.e., cache line replacement) in accordance with an example embodiment of the present disclosure. As shown in FIG. 6, a determination is made to evict a cache line (Block 602). As described above, the cache system shown in FIG. 3 is configured as an inclusive cache system. The controller 302 is configured to determine that that a cache line 206 within an L(x+1) cache 308 needs to be evicted. For example, the controller 302 may receive a request to store new data, which requires older data to be evicted (e.g., removed). A cache line state is set to evicting (Block 604). The controller 302 is configured to set the eviction state of the cache line 206 to "Evicting" (e.g., modify the flag 208 within the cache tag array 204 of the corresponding cache line 206 to indicate that the cache line 206 is to be evicted).

A determination is made of whether newer data (e.g., more recently modified data) is available from a lower level cache (Decision Block 606). As described above, the controller 302 is configured to execute a snoop operation to determine whether the corresponding cache line 206 within the L(x) cache has more recent data than the cache line of the L(x+1) cache. If there is no modified data within the corresponding cache line of the L(x) cache (NO from Decision Block 606), the cache line is evicted and written to the next level cache or to system memory (Block 608). The eviction buffer 318 is configured to generate an eviction of the cache line. The cache line is re-written into the L(x+2) cache or the system memory. If there is modified data within the corresponding cache line of the L(x) cache (YES from Decision Block 606), the modified data is written to the cache line of the L(x+1) cache (Block 610). Once the modified data has been stored within the L(x+1) cache, the cache line is evicted and written to the next level cache or to system memory (Block 608).

The cache line state is set to fill pending within the cache tag array (Block 612). The eviction buffer 318 is configured to clear the eviction state (e.g., un-set the eviction flag within the flag 208) and the fill pending state is set (e.g., set a fill pending flag within the fill pending flag 210). For example, the flag 210 is set such that the cache tag array 204 indicates that the cache line 206 is ready to receive data from a line fill operation. The buffer 318 also is configured to update the tag array 204 with the address tag for the outstanding line fill. As described above, the controller 302 is configured to check a cache tag status within the tag array 204 before the data array 202 is updated with the data replacing the evicted data. If the status within the tag array 204 is set to "Evicting," the line fill data (e.g., data replacing the evicted data) is stored within a data buffer, such as the read request buffer 320, or the like. As shown in FIG. 6, the fill pending state is cleared upon completion of the line fill operation (Block 614). Once the line fill operation has completed, the fill pending state is cleared. For example, the flag 210 is set (or re-set) to indicate the line fill operation has been cleared.

In some embodiments of the present disclosure, the controller 302 forwards the line fill data to the L(x) cache to reduce additional latency that may occur while awaiting for an eviction to complete. However, it is understood that the controller 302 forwards the line fill data to the L(x) cache when the cache state of the L(x+1) cache is "fill pending" to reduce additional latency. The controller 302 is configured to forward the line fill data to the L(x) cache in parallel with one or more of the aforementioned processes (e.g., Blocks 604 through 612).

Figure 7:
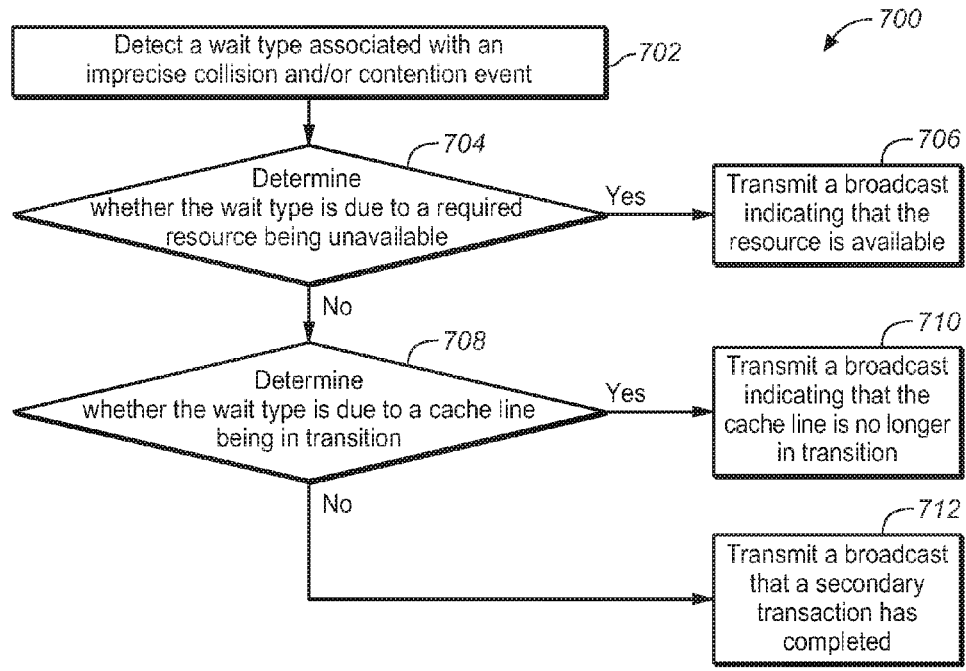
FIG. 7 is a method diagram for detecting a wait type associated with an imprecise collision and/or contention event in accordance with an example embodiment of the present disclosure.

FIG. 7 illustrates a flow diagram for an example method 700 for detecting a wait type related to an imprecise collision and/or contention type and broadcasting a cache state update in response thereto. A wait type (e.g., wait event) associated with an imprecise collision and/or contention event is detected (Block 702). The controller 402 is configured to detect (e.g., identify) a wait type associated with an imprecise collision and/or contention event due to resources (e.g., buffers, etc.) not being available for allocation for a line fill operation. As described above, a wait type may be detected based upon a required resource not being available, a cache line being in transition, or a cache line is in use. As shown in FIG. 7, a determination is made of whether the wait type is due to a required resource being unavailable (Decision Block 704). The controller 402 determines that a resource for a line fill is unavailable due to no available cache locations being available in a congruence class or an eviction is required and there is inadequate locations and/or space in the eviction buffer 416 (e.g., cannot allocate for the line fill). If the wait type is due to the required resource being unavailable (YES from Decision Block 704), the resource (e.g., buffer) contended for is configured to broadcast to the transaction source (e.g., the portion of the cache controller configured to read and write to the tag array is configured to broadcast to the portion of the cache controller managing the request buffers) contending for the resource indicating that the resource has available resources (Block 706). For example, when a line fill operation cannot be granted due to a congruence class being in a state that prevents allocation, the buffer that is contended for is configured to broadcast to the transaction sources the tag address corresponding to the line fill operation that requires the resource. In another example, the eviction buffer 416 is configured to broadcast completions of previous, unrelated, evictions indicating eviction buffers are now available.

If the wait type is not due to the required resource being unavailable (NO from Decision Block 704), a determination is made of whether the cache line is in transition (Decision Block 708). The controller 402 is configured to determine whether the cache line 206 associated with the imprecise collision/contention event is in transition (e.g., a corresponding cache line has not been evicted, cache line has a non-stable cache state, etc.). If the cache line is in transition (YES from Decision Block 708), a broadcast including an updated tag state is transmitted upon determining that the cache line is no longer in transition (Block 710). The controller 402 is configured to cause transmission of a broadcast indicating that the cache line (e.g., the cache line previously determined to be in transition) is not in transition, and the broadcast includes an updated tag state.

If the wait type is not due to a cache line in transition (NO from Decision Block 708), a determination is made that the cache line is in use. The controller 402 is configured to determine that a cache lookup request has generated a secondary transaction that may cause the cache state or the cache data to be changed. Thus, the secondary transaction is required to compete before any additional accesses to the corresponding cache line can proceed. A resource (e.g., a buffer) implementing the secondary transaction is configured to transmit a broadcast indicating the secondary transaction has completed (Block 712). In an embodiment of the present disclosure, each resource (e.g., a resource engine) implementing the secondary transaction is configured to broadcast indicating that the secondary transaction has completed. For example, a broadcast may be transmitted for each secondary transaction.

Figure 8:
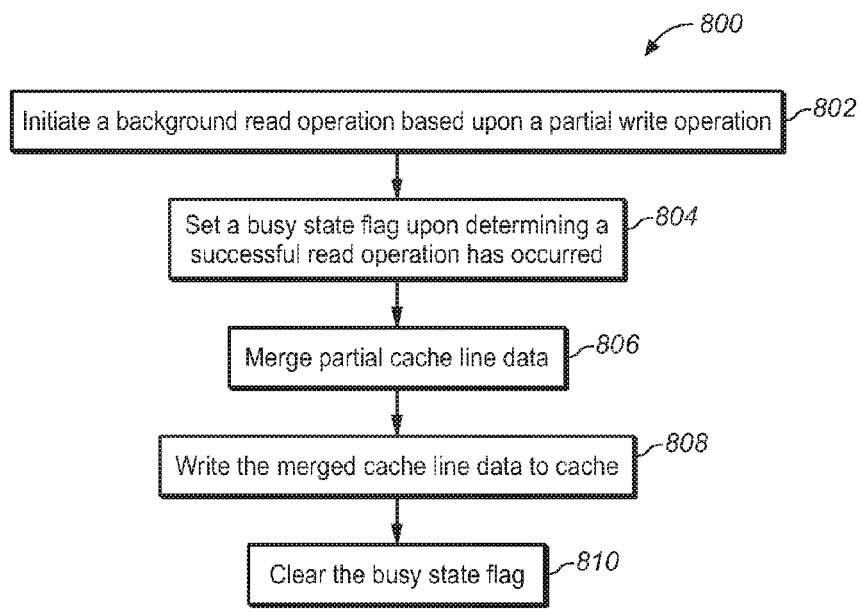
FIG. 8 is a method diagram for resolving partial write operations between multiple bus masters accessing a shared cache system in accordance with an example embodiment of the present disclosure.

FIG. 8 illustrates a flow diagram for an example method 800 for resolving partial write collisions between different bus masters accessing a shared cache system. As shown in FIG. 8, a background read operation is initiated (Block 802). The controller 502 is configured to initiate a background read operation upon determining a partial write operation has been received from a bus master 506A, 506B. For example, the cache controller 502 receives a partial write operation from a bus master 506A, 506B that is to be merged with data in a cache line 206. In some embodiments of the present disclosure, a first bus master 506A issues a first partial write operation to store data at a first cache line 206 in the cache 512, and a second bus master 506B issue a second partial write operation to store data in the cache 512 at the same cache line 206 location. A busy state flag is set upon determining a successful background read operation has occurred (Block 804). The tag array 204 includes a busy state flag 212 that is configured to be set by the controller 502 when a background read occurs and completes successfully (e.g., partial cache line data is copied from the cache 512 to a respective background write data buffer 508A, 508B). When the busy state flag 212 is set (i.e., set to indicate "Busy"), other resources (e.g., buffers) are prevented from performing a background read operation to the corresponding cache line 206.

The partial cache line data is merged (Block 806). As described above, data representing data of the partial write operation (e.g., data from the bus masters 506A, 506B) is merged with the data copied to the background write data buffer 508A, 508B. For example, the first partial cache line data is merged with existing cache line 206 data. The merged data is written back to cache (Block 808). Upon the merge operation, the merged data is then written back to the cache 512. As shown in FIG. 8, the busy state flag is cleared (Block 810). Once the merged data is written to the cache 512, the busy state flag is un-set (e.g., the busy flag 212 is cleared). Once the busy state flag is cleared, which indicates the write operation has completed, the second partial write operation can proceed (e.g., steps described with respect to Blocks 802 through 810) utilizing the merged data associated with the first partial write operation.

Generally, any of the functions described herein can be implemented using hardware (e.g., fixed logic circuitry such as integrated circuits), software, firmware, manual processing, or a combination of these embodiments. Thus, the blocks discussed in the above disclosure generally represent hardware (e.g., fixed logic circuitry such as integrated circuits), software, firmware, or a combination thereof. In the instance of a hardware embodiment, for instance, the various blocks discussed in the above disclosure may be implemented as integrated circuits along with other functionality. Such integrated circuits may include all of the functions of a given block, system or circuit, or a portion of the functions of the block, system or circuit. Further, elements of the blocks, systems or circuits may be implemented across multiple integrated circuits. Such integrated circuits may comprise various integrated circuits including, but not necessarily limited to: a monolithic integrated circuit, a flip chip integrated circuit, a multichip module integrated circuit, and/or a mixed signal integrated circuit. In the instance of a software embodiment, for instance, the various blocks discussed in the above disclosure represent executable instructions (e.g., program code) that perform specified tasks when executed on a processor. These executable instructions can be stored in one or more tangible computer readable media. In some such instances, the entire system, block or circuit may be implemented using its software or firmware equivalent. In other instances, one part of a given system, block or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a cache controller configured to operatively couple to a cache memory device, the cache memory device configured to store a plurality of cache lines,
   the cache controller configured to detect a wait type due to an at least one of an imprecise collision event or an imprecise contention event associated with at least one cache line of the plurality of cache lines; and cause transmission of a broadcast to at least one transaction source requesting the at least one cache line, the broadcast indicating the at least one transaction source can employ the at least one cache line,
   wherein imprecise collision events and imprecise contention events indicate that a resource is not available, and occur when resources cannot be allocated for a line fill operation.

2. The apparatus as recited in claim 1, wherein each cache line of the plurality of cache lines associated with a tag entry within a cache tag array, the tag entry including cache state data for each corresponding cache line,
   the cache controller configured to determine at least one cache line is to be evicted; set the cache state data for the at least one cache line to indicate the at least one cache line is marked for eviction; determine whether modified data is available for the at least one cache line; evict the at least one cache line; and set the cache state data corresponding to the at least one cache line to indicate the at least one cache line is ready to receive data from a line fill operation.

3. The apparatus as recited in claim 2, wherein the cache controller is further configured to perform a snoop request to determine whether a cache line included within a second cache memory device that corresponds to the at least one cache line includes modified data.

4. The apparatus as recited in claim 1, wherein each cache line of the plurality of cache lines associated with a tag entry within a cache tag array, the tag entry including cache state data for each corresponding cache line,
the cache controller configured to receive a partial write request associated with at least one cache line of the plurality of cache lines, the partial write request associated with a first portion of data; in response to receiving the partial write request, perform a background read operation to the at least one cache line, the background read operation associated with a second portion of data; modify the cache data state for the at least one cache line to prevent further access to the at least one cache line; merge the first portion of data with the second portion of data; write the merged data to the at least one cache line; and modify the cache data state for the at least one cache line to allow access to the at least one cache line.

5. The apparatus as recited in claim 4, wherein the cache state data comprises a busy flag portion within the cache tag array.

6. The apparatus as recited in claim 4, wherein the cache controller is configured to prevent a transaction source from accessing the at least one cache line when the cache data state is modified to prevent further access to the at least one cache line.

7. The apparatus as recited in claim 1, wherein the wait type comprises a required resource being unavailable for the at least one cache line, and wherein the broadcast includes an indication the required resource is available.

8. A system comprising:
a cache memory device, the cache memory device configured to store a plurality of cache lines;
a cache controller operatively coupled to the cache memory device, the cache controller configured to detect a wait type due to an at least one of an imprecise collision event or an imprecise contention event associated with at least one cache line of the plurality of cache lines; and cause transmission of a broadcast to at least one transaction source requesting the at least one cache line, the broadcast indicating the at least one transaction source can employ the at least one cache line
wherein imprecise collision events and imprecise contention events indicate that a resource is not available, and occur when resources cannot be allocated for a line fill operation.

9. The system as recited in claim 8, wherein each cache line of the plurality of cache lines associated with a tag entry within a cache tag array, the tag entry including cache state data for each corresponding cache line,
the cache controller configured to determine at least one cache line is to be evicted; set the cache state data for the at least one cache line to indicate the at least one cache line is marked for eviction; determine whether modified data is available for the at least one cache line; evict the at least one cache line; and set the cache state data corresponding to the at least one cache line to indicate the at least one cache line is ready to receive data from a line fill operation.

10. The system as recited in claim 9, wherein the cache controller is further configured to perform a snoop request to determine whether a cache line included within a second cache memory device that corresponds to the at least one cache line includes modified data.

11. The system as recited in claim 8, wherein each cache line of the plurality of cache lines associated with a tag entry within a cache tag array, the tag entry including cache state data for each corresponding cache line,
the cache controller configured to receive a partial write request associated with at least one cache line of the plurality of cache lines, the partial write request associated with a first portion of data; in response to receiving the partial write request, perform a background read operation to the at least one cache line, the background read operation associated with a second portion of data; modify the cache data state for the at least one cache line to prevent further access to the at least cache line; merge the first portion of data with the second portion of data; write the merged data to the at least one cache line; and modify the cache data state for the at least one cache line to allow access to the at least one cache line.

12. The system as recited in claim 11, wherein the cache state data comprises a busy flag portion within the cache tag array.

13. The system as recited in claim 11, wherein the cache controller is configured to prevent a transaction source from accessing the at least one cache line when the cache data state is modified to prevent further access to the at least one cache line.

14. The system as recited in claim 8, wherein the wait type compnses a required resource being unavailable for the at least one cache line, and wherein the broadcast includes an indication the required resource is available.

15. A method comprising:
detecting a wait event due to at least one of an imprecise collision event or an imprecise contention event associated with at least one cache line of a plurality of cache lines stored within a cache memory device;
determining the type of wait event associated with the at least one cache line; and causing transmission of a broadcast to at least one transaction source requesting the at least one cache line, the broadcast indicating the at least one transaction source can employ the at least one cache line, the broadcast based upon the type of wait event,
wherein imprecise collision events and imprecise contention events indicate that a resource is not available, and occur when resources cannot be allocated for a line fill operation.

16. The method as recited in claim 15, further comprising:
determining at least one cache line is to be evicted;
setting a cache state data for the at least one cache line to indicate the at least one cache line is marked for eviction;
evicting the at least one cache line; and
setting the cache state data corresponding to the at least one cache line to indicate the at least one cache line is ready to receive data from a line fill operation.

17. The method as recited in claim 16, further comprising performing a snoop request to determine whether a cache line included within a second cache memory device that corresponds to the at least one cache line includes modified data.

18. The method as recited in claim 15, further comprising:
receiving a partial write request associated with at least one cache line of the plurality of cache lines, the partial write request associated with a first portion of data;
performing a background read operation to the at least one cache line, the background read operation associated with a second portion of data in response to receiving the partial write request;
modifying a cache data state for the at least one cache line to prevent further access to the at least one cache line;
merging the first portion of data with the second portion of data;
writing the merged data to the at least one cache line; and
modifying the cache data state for the at least one cache line to allow access to the at least one cache line.

19. The method as recited in claim 18, wherein the cache state data comprises a busy flag portion within the cache tag array.

20. The method as recited in claim 18, further comprising preventing a transaction source from accessing the at least one cache line when the cache data state is modified to prevent further access to the at least one cache line.

\* \* \* \* \*